June 30, 1931. E. W. JOHNSON 1,812,049
TRACTOR HITCH
Filed Sept. 23, 1927
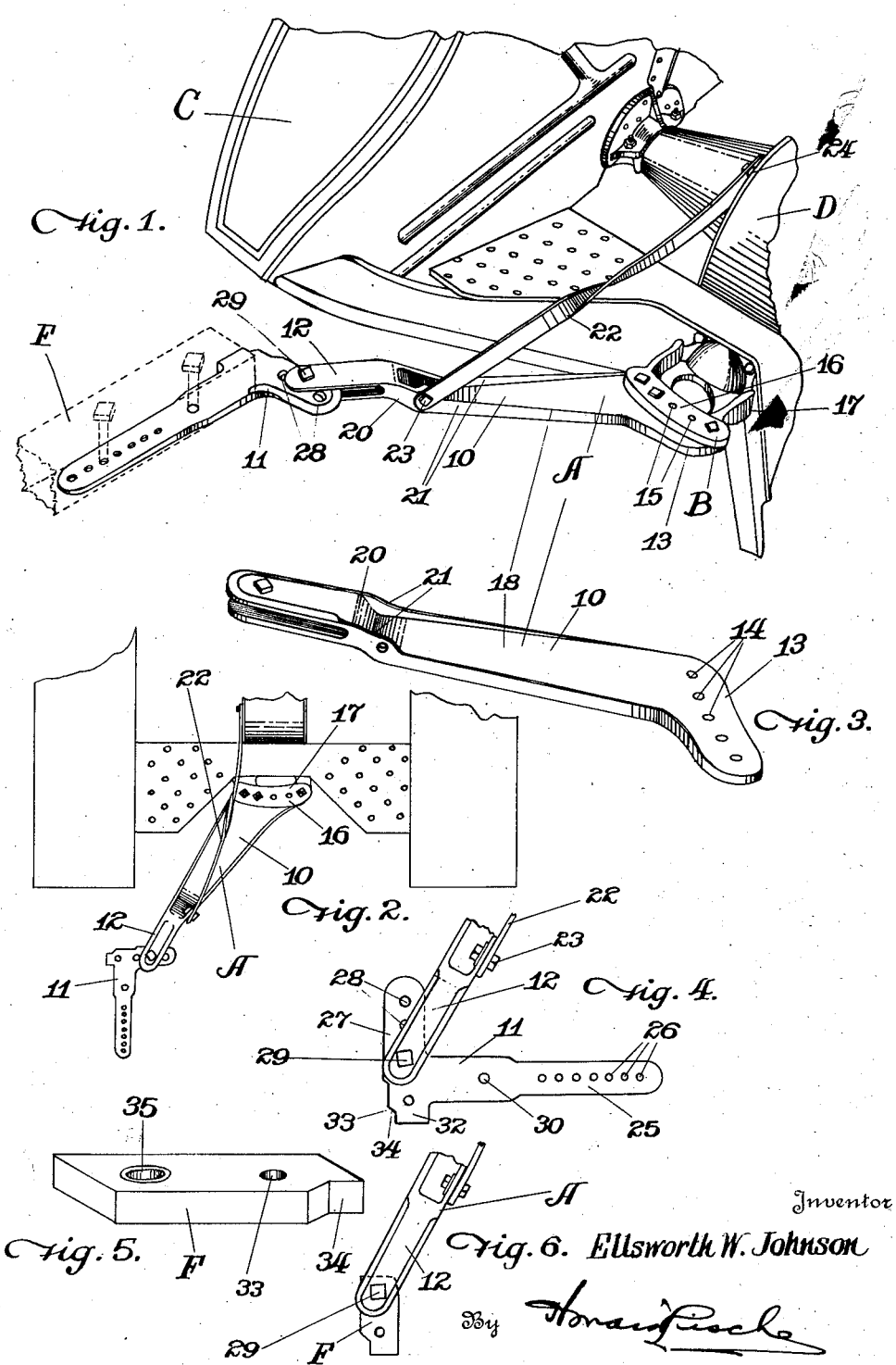
Inventor
Ellsworth W. Johnson
By Howard Fischer
Attorney Patented June 30, 1931

1,812,049

UNITED STATES PATENT OFFICE

ELLSWORTH W. JOHNSON, OF HECTOR, MINNESOTA, ASSIGNOR TO MIDWEST MOTOR SUPPLY, OF HECTOR, MINNESOTA

TRACTOR HITCH

Application filed September 23, 1927. Serial No. 221,505.

My invention relates to a tractor hitch having a particular design adapted to be connected to the tractor in a manner so that the tongue of the farm implement may be connected to the hitch offset from the center of the tractor, yet so positioned as to equalize the pull on the tractor by means of the peculiar design and leverage which I have developed in my hitch.

A feature of my invention resides in a hitch having a main arm extending angularly and provided with a reinforced edge along a portion of the same and a portion which is offset from the plane of the body portion and provided with a bifurcated end for the connection of the tongue part connected to the main hitch arm. The particular formation and construction of this main arm is of importance in carrying out the principle of my invention. A suitable brace means is associated with the main hitch arm to steady the same.

It is also an object of my invention to provide a hitch having an adjustable tongue connection which may be connected at different points in the link connecting the main arm of the hitch with the tongue of the implement the tractor is to pull. This connecting link is a feature of the invention in its peculiar shape which is provided with a series of openings on either end for adjustable connections and which is provided with a long and short connecting arm together with an offset tongue portion so that the link may be turned in a manner to connect it with the main arm of the tractor hitch in different positions. Another object is to provide a connecting link which is adapted to be used in connection with tongues on implements wherein an offset portion is formed in the link to receive the tongue.

These features and objects, together with other details and peculiar formation of parts will be more clearly and fully set forth in the specification and claims.

In the drawings forming part of this specification:

Figure 1 is a perspective view of my tractor hitch in use.

Figure 2 is a plan view of the same.

Figure 3 is a perspective view of the main arm of the tractor hitch.

Figure 4 is a detail of a different manner of connecting the link with the hitch main arm.

Figure 5 is a perspective of an auxiliary connecting link.

Figure 6 is a detail portion of the main arm of the tractor hitch connected with the auxiliary link, illustrated in Figure 5.

My tractor hitch A is adapted to be connected directly to the tractor hitch connection B so that the hitch extends from the back of the tractor C.

The hitch A is composed of the main arm 10 which engages the connecting link 11 by the bifurcated end 12 extending from the main arm 10.

The front or inner end 13 of the arm 10 is formed in a flat plate-like portion having a series of openings 14 in the plate portion 13 which are adapted to coincide with the openings 15 in the flange 16 formed on the tractor hitch connection 17. The member 17 is rigidly attached by suitable bolts in the ordinary well known manner to the axle D of the tractor. Only a portion of the tractor is illustrated in the drawings. The main arm 10 is formed with its body portion 18 extending angularly from the plate portion 13 and to one side of the same so as to extend the bifurcated connecting end 12 toward the side of the tractor to permit the tongue E of an implement to be attached to the link 13 in an offset position in relation to the tractor. The object of this is to permit the farm implement such as a binder or plow or other article to operate to one side of the tractor. A tractor hitch must be designed so as to operate in a manner to pull the implement and to equalize the pulling force so that it would be directed to the center of the tractor at the connection 17, otherwise the side draft on the tractor would be detrimental. I have designed my tractor hitch A so as to accomplish these features and I have formed the main arm 10 with the bifurcated portion 12 offset from the plane of the body portion 18 of the arm 10.

The connecting plate or member 17 is ordinarily positioned quite low on the tractor and particularly with certain forms of tractors. Thus by elevating the bifurcated portion 12 by the offset portion 20 the connecting link 11 is in a better position to connect with the tongue E of the implement, and a further feature of offsetting the portion 12 resides in having an end portion on the main arm 10 of the hitch A which is so positioned as to permit the tongue of the implement with the connecting link 11 to swing to either side of the arm 10 without striking the same, even though the tractor implement which is provided with the tongue E swings at approximately right angles to the connecting end 12 of the hitch A in either direction. This offset portion is important as a feature in my invention and I provide strengthening ribs 21 on each side of the arm 10 and at the offset portion 20 so as to strengthen the main arm 10 in a desirable manner.

I also provide a brace member 22 which is connected on one end by the bolt 23 to one of the ribs 21 of the arm 10, and the other end is connected at 24 to the axle D of the tractor. This steadies the outer bifurcated end 12 of the tractor hitch A.

My tractor hitch includes a particular shaped connecting link 11 which forms an important feature of my invention. This link 11 is provided with a tongue portion 25 having a series of openings 26 which permit the adjustable connection of the tongue E of the farm implement, the tongue E being shown only in dotted outline in the drawings. Extending right angularly from the tongue portion 25 of the connecting link 11 I provide a head portion 27 which is formed with a series of openings 28 to permit the adjustable connection of the link 11 with the main arm 10 of the hitch A. Thus the bolt 29 is adapted to extend through the bifurcated end 12 and through one of the openings 28 to permit the attachment of the link 11 to the main arm 10 of the hitch A.

It is important that the hitch A be provided with the adjustable openings 14 at the connector 17 and that the link 11 is provided with adjustable openings 28 so that the position of the farm implement may be varied in accordance with the draft of the same on the tractor C. This permits the user of my hitch A to properly adjust the same so that the tractor C can pull the implement most efficiently for the work being done.

The openings 26, together with a main opening 30 positioned just beyond the openings 26 in the link 11 permit the attachment of the tongue E of the farm implement as desired to the link 11.

There are some farm implements which have a particular tongue connection and I have provided my link 11 with a short projecting tongue portion 32 and a connecting opening 33 together with the notched side portion 34. This tongue 32 extends directly opposite and virtually in line with the portion 27 of the link 11 and permits the attachment of the farm implement to this portion of the link 11. When the link 11 is used in this manner then the tongue portion 25 extends to one side as illustrated in the detail plan view of Figure 4.

My tractor hitch may be provided with an auxiliary link F which is similar to the tongue 32 and is provided with the same notched formation 34 and also the connecting opening 33 and a bushed connecting opening 35 which takes the place of one of the openings 28 in the link 11. When this form of connector link is used then the bifurcated end 12 of the tractor hitch A is connected by the bolt 29 as illustrated in the detail plan view in Figure 6.

My tractor hitch is designed with a particular formation and may be used more particularly with a certain type of tractor, but I have found that the practical nature of this design of tractor hitch is such that it fulfills a very practical desire for those using tractors of this nature and the actual use and tests of the hitch A have proved very satisfactory. The main arm 10 is strong and is wide adjacent the plate 13 tapering off toward the bifurcated end 12 and having the offset portion 21, together with the brace portion 22. Then the link 11 is adjustably connected so that it can operate to pull the farm implement in a manner to operate along side of the tractor, thus pulling a binder, corn cutter and husker, or similar implements, together with other implements where it is desired to pull the same in a manner to operate at one side of the tractor and yet direct the pull to the center of the tractor without an undesirable side draft. The formation of my tractor hitch A permits the same to pull farm implements so that they can turn right angular corners, a feature which is very desirable.

In accordance with the patent statutes I have described the principles of operation of my tractor hitch and while I have illustrated a particular formation and construction of the same, I desire to have it understood that the illustrations are merely suggestive of a means of carrying out the invention and that other formations and designs may be employed within the scope of the following claims without departing from the spirit of my invention.

I claim:

1. A tractor hitch including, a main draft arm having a formation to offset the draft point to extend to one side of the center of a tractor, a tongue connecting link, and a short projecting tongue and notched portion formed in said link to engage the tongue of an implement by said short tongue and notched portion.

2. A tractor hitch comprising, two members, one of which provides the main draft arm, and the other forming the tongue connecting link, said tongue connecting link having a head portion formed thereon, a long tongue extending virtually at right angles to said head portion, and a short tongue extending approximately longitudinally with said head portion, said head portion and said long tongue having a series of connecting openings formed therein.

ELLSWORTH W. JOHNSON.